United States Patent
Mockenhaupt et al.

(10) Patent No.: US 6,503,435 B1
(45) Date of Patent: Jan. 7, 2003

(54) METHOD OF MAKING A GASKET HAVING AN ELASTOMERIC SEAL

(75) Inventors: Martin Mockenhaupt, Highland Park, IL (US); Albert Henhapl, Palatine, IL (US); Paul Estrich, Skokie, IL (US)

(73) Assignee: Fel-Pro Incorporated, Skokie, IL (US)

( * ) Notice: Subject to any disclaimer, the term of this patent is extended or adjusted under 35 U.S.C. 154(b) by 935 days.

(21) Appl. No.: 08/713,783

(22) Filed: Sep. 13, 1996

(51) Int. Cl.[7] .................. B29C 39/10; B29C 45/14

(52) U.S. Cl. ................. 264/274; 264/261; 264/263; 264/267

(58) Field of Search .................. 264/274, 267, 264/261, 263

(56) References Cited

U.S. PATENT DOCUMENTS

| | | | | |
|---|---|---|---|---|
| 3,533,896 A | * | 10/1970 | Hartig | 264/274 |
| 4,861,540 A | * | 8/1989 | Nieboer et al. | 264/263 |
| 4,916,799 A | * | 4/1990 | Skinner et al. | 264/274 |
| 5,261,721 A | * | 11/1993 | Conger et al. | 296/146.15 |
| 5,660,447 A | * | 8/1997 | Angelici | 301/5.7 |

* cited by examiner

*Primary Examiner*—Jan H. Silbaugh
*Assistant Examiner*—Edmund H. Lee
(74) *Attorney, Agent, or Firm*—Reising, Ethington, Barnes, Kisselle, Learman & McCulloch, PC

(57) ABSTRACT

An gasket having a molded plastic carrier and an edge-molded seal in an opening through the carrier. The wall surface of the opening has inwardly projecting anchors formed of an inner plate and a radial hub. The seal is molded to the anchors and is held in place thereby.

5 Claims, 2 Drawing Sheets

FIG - 1
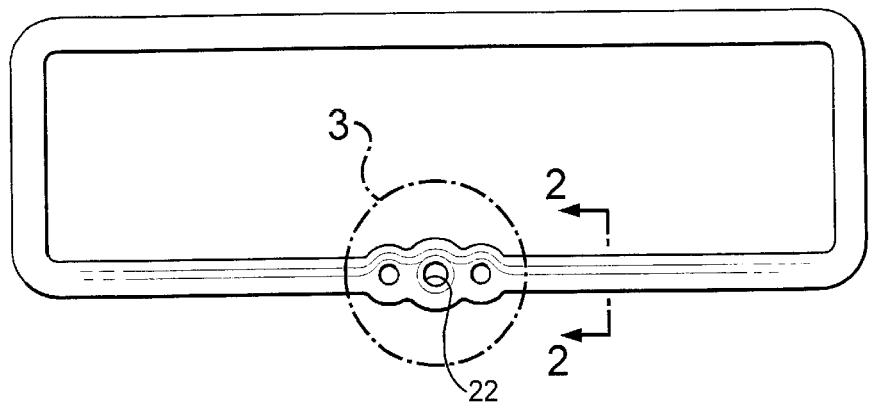
FIG - 2
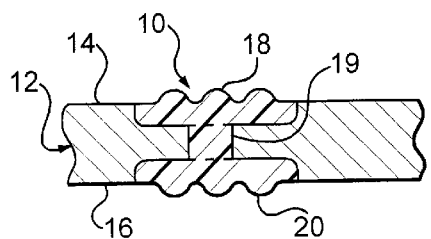
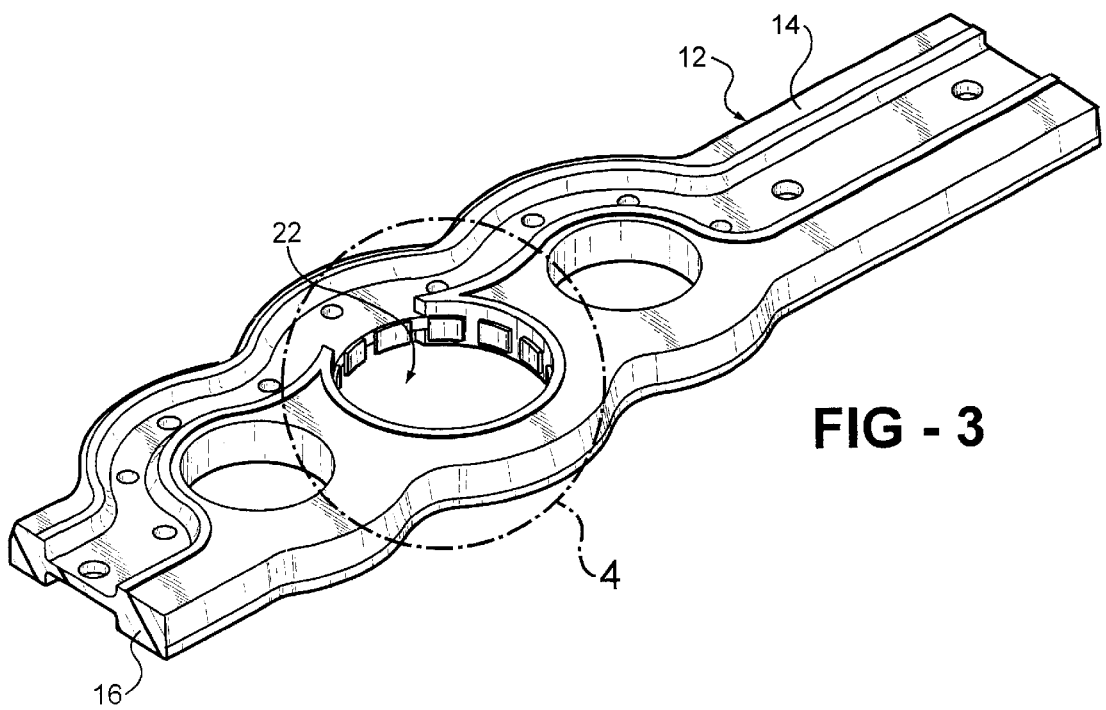
FIG - 3 ic # METHOD OF MAKING A GASKET HAVING AN ELASTOMERIC SEAL

BACKGROUND OF THE INVENTION

Many gaskets today are fabricated from a molded plastic carrier with which elastomeric seals are associated. The elastomeric seals may be perimetric seals, such as ones which circumscribe such a gasket on each of its major faces, or which may be edge molded to an edge surface of the gasket. Gaskets having such seals may also employ sealing elements for the inner surfaces of openings, such as bolt holes. One usual technique for associating sealing elements with a carrier comprises the edge molding of a sealing element to the carrier and securing its adhesion with the aid of a chemical adhesive. Another technique is to mold perforated plastic carrier projections in a carrier opening to be sealed. Molten liquid sealant will flow through the perforation and will set up as the sealant solidifies, thereby to secure the sealing element in place.

In many environments techniques such as those are disadvantageous. For example, the use of adhesive securance techniques typically requires an expensive adhesive and additional handling, and does not permit the straightforward molding of an elastomeric seal in situ. In the case of the use of perforated projections, they require a longer engaged length of the final seal because of the necessary length of the perforated plastic projections.

It would be desirable to provide an edge molding technique for openings and the like for effectively securing perimetric seals so that they may be molded in situ without requiring either extraneous adhesives or the longer engaged length which projecting perforated plastic projections dictate, and which technique will also permit the use of but a thin layer of sealing material to provide the necessary seal.

SUMMARY OF THE INVENTION

In accordance with the present invention, a method of making a gasket having an elastic seal molded thereto is provided comprising the steps of providing a molded plastic carrier defining a carrier surface against which an elastomeric seal is to be molded, the carrier surface defining a plurality of anchors projecting therefrom, each anchor comprising a hub extending outwardly from the carrier surface and a protuberance at the end of the hub, the hub having a first cross-sectional dimension and the protuberance having a second cross-sectional area which is at least twenty percent greater than the first cross-sectional area, then molding an elastomeric seal against the carrier surface by flowing molten elastomer to fully embed the hubs and protuberances within the molten elastomer, whereby when the elastomer solidifies, the anchors secure the elastomeric seal to the plastic carrier. In one form the carrier surface comprises a wall of an opening through the carrier. In a preferred form the protuberance is a plate spaced from the carrier wall surface by the hub, and the carrier wall surface comprises a generally cylindrical opening and the hub projects radially inwardly of the cylindrical opening.

The invention also comprises a gasket having a plastic carrier and an elastomeric seal molded thereto, the plastic carrier defining at least one opening therethrough and having a wall surface therearound. The elastomeric seal is molded to and against the wall surface. The wall surface has a plurality of anchors projecting inwardly therefrom, each anchor comprising an inner member and a hub connecting the inner member to the wall surface, the hub having a cross-sectional dimension which is less than the cross-sectional dimension of the inner member, the anchors being embedded in the elastomeric seal thereby securing the seal in the opening and against the wall surface.

Further objects, features and advantages of the present invention will become apparent from the following description and drawings.

BRIEF DESCRIPTION OF THE DRAWINGS

FIG. 1 is a top plan view of a typical gasket incorporating an edge seal applied in accordance with the present invention;

FIG. 2 is a cross-sectional view taken substantially along line 2—2 of FIG. 1;

FIG. 3 is an enlarged perspective view of a fragmentary carrier portion of the gasket of FIG. 1;

DETAILED DESCRIPTION

Figure 4:
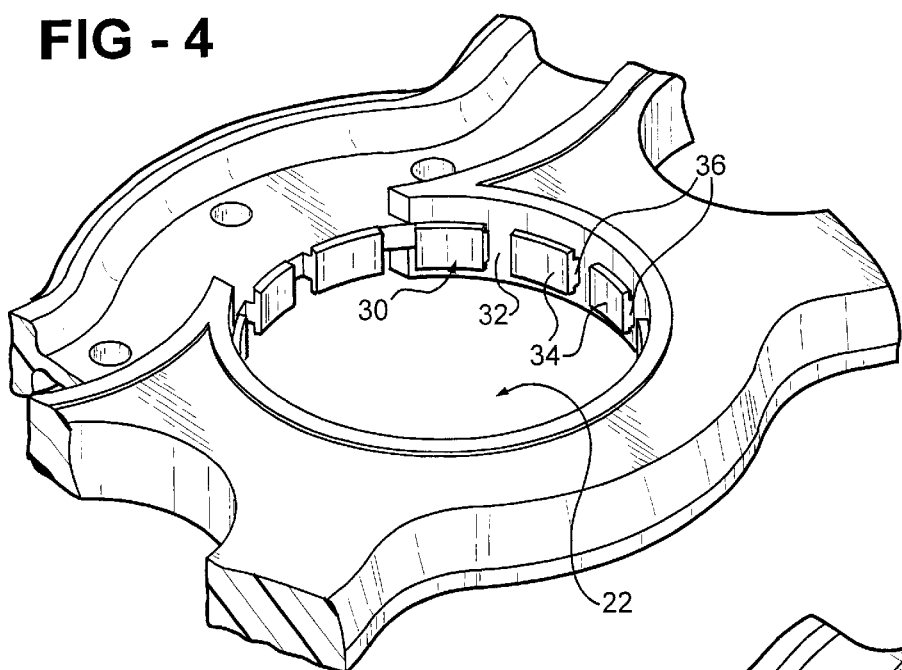
FIG. 4 is an enlarged view of a portion of FIG. 3.
Figure 5:
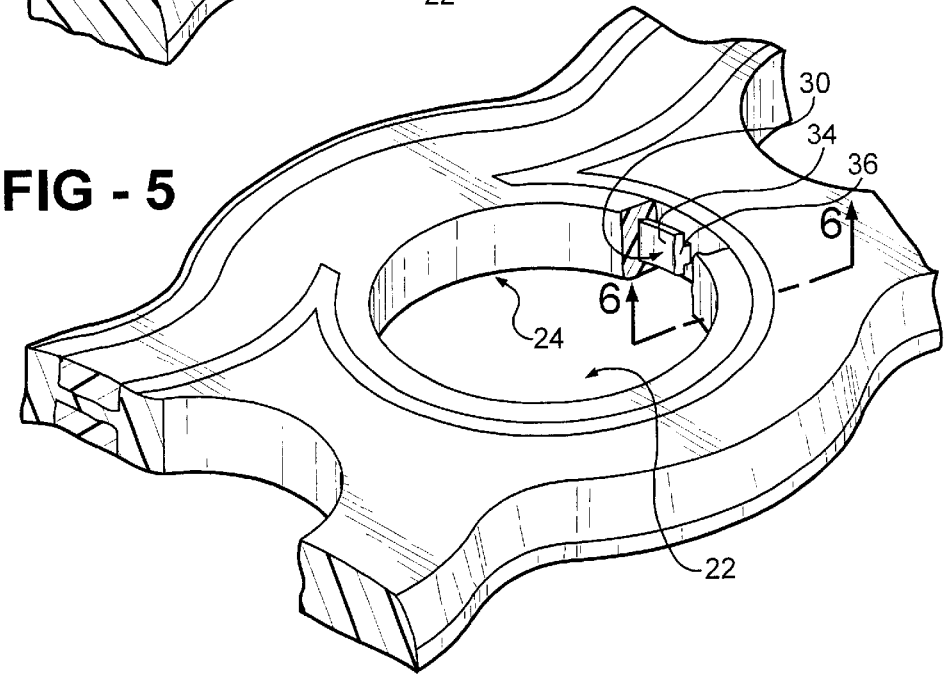
FIG. 5 is a view like FIG. 4, but with an edge molded seal in the opening, with a fragmentary portion of the seal broken away.
Figure 6:
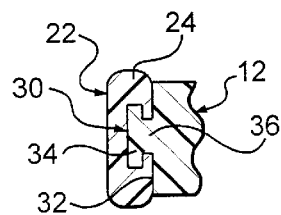
FIG. 6 is a cross-sectional view taken substantially along line 6—6 of FIG. 5.

Referring first to FIGS. 1–6, an improved sealing mechanism in accordance with the present invention is shown as being embodied in an exemplary gasket 10. Gasket 10 comprises a molded plastic carrier 12 having a pair of main surfaces 14, 16. Carrier 12 may be of nylon, although other plastic materials such as polyphenylene sulfide and polyetherimide, among others, may be used as well. Surfaces 14, 16 define recesses in which perimetric seals 18, 20 are disposed for sealing against opposed flanges. Seals 18, 20 are molded in situ and are locked in position by the connections 19 which pass through openings in the carrier as illustrated by FIG. 2. When the gasket 10 is used as an oil pan gasket, the gasket may seal confronting block and oil pan flanges, and it is adapted to be clamped there-between by suitable bolts which pass through cylindrical bolt holes 22 which extend through the gasket 10.

Bolt holes 22 which extend through the carrier 12 are provided with edge-molded annular elastomeric seals 24. Seals 24 are positioned to bear and seal against the opposed flanges to assure that there is no leakage therepast. That is especially important where the surfaces 14, 16 open into the bolt holes 22 and the perimetric seals 16, 18 merge with the annular seals 24, as they do in this case, as is apparent from FIG. 5.

The material of which the seals 18, 20 and 24 are formed is frequently relatively expensive. For example, in this case, the elastomeric sealing material is a polysiloxane (silicone), although other sealants such as butadiene acrylonitrile and a fluorinated hydrocarbon such as Viton, among others, may be used as well. As such it is desirable to minimize the use of the sealant material, consistent with providing seals which are long-lived and fully effective for their intended purposes. In many circumstances, it is also desirable to minimize the thickness of the carrier and seal sections as well. Thus, it is desirable to provide seals in the bolt holes which are as thin in the radial direction as possible and which are held in position so that they do not delaminate or otherwise change in character in ways which might diminish their sealing capacity.

To that end, bolt holes 22 are each provided with a series of undercut anchors 30 which protrude radially inwardly from the carrier wall 32. Anchors 30 comprise a protuberance or inner plate such as a flat anchor plate 34 and a hub 36 of a reduced cross-sectional dimension formed with and spacing the anchor plate 34 from the carrier wall 32. In particular, the anchor plate 34 extends above the hub (and preferably also below the hub 36). The plate could project laterally beyond the hub 36 as well. The cross-sectional dimension of the hub is less than that of the plate, and is preferably at least twenty percent less.

As will be clear from FIGS. 3 to 6, when the seal 24 is formed in situ in the bolt hole 22 in the carrier, the liquid elastomeric sealing material is caused to flow into the zone behind the anchor plate 34 and to solidify behind the anchor plate 34 and in the zones between the anchor plate 34 and the carrier wall 32 and the reduced dimension hub 36 thereby to embed the hubs and plates. Additionally, where the bolt hole 22 merges with the carrier surface zones in which the perimetric seals 18, 20 are molded (See FIGS. 3–5), the sealing material behind the anchor plates 34 forming the seal 24 solidifies with the seals 18, 20, and is thereby anchored and secured to the carrier.

Figure 7:
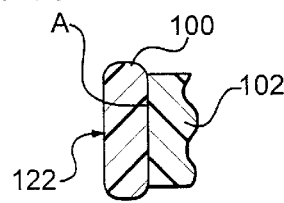
FIG. 7 is a cross-sectional view of a typical prior art edge molded seal taken at a location like that shown in FIG. 6.
Figure 8:
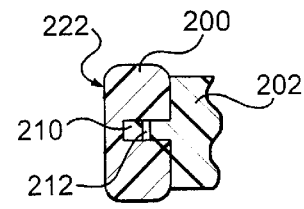
FIG. 8 is a cross-sectional view of a design for an edge molded seal secured by a perforated plastic projection taken at a location like that shown in FIG. 6.

This is to be contrasted with the typical prior art methods for edge molding seals to plastic carriers and the like. For example, as shown in FIG. 7, a typical adhesively secured edge molded seal is shown in which the seal 100 is molded in an opening 122 in a carrier 102 with an intermediate layer of adhesive A which has been applied to the carrier 102 prior to molding, typically as by an adhesive dip. The seal 100 of FIG. 7 is shown in an environment comparable to that of FIG. 6. In FIG. 8, an edge molded seal 200 is secured in an opening 222 in a carrier 202 via a plastic projection 210 which defines a perforation 212 through which molten sealing material may flow prior to the time seal 200 solidifies in situ. As may be appreciated, the projection 210 requires a greater thickness of sealing material to embed it, which increases the cost of the material.

Although the method of the present application has been illustrated for use in a valve cover gasket, it may be used in a variety of automotive and other gaskets as well, including oil pan gaskets, front cover gaskets, water pump gaskets, among others.

It will be apparent to those skilled in the art from the foregoing that modifications may be made in the embodiment illustrated without departing from the spirit and scope of the invention. For example, the anchors 30 shown for use in the bolt hole 22 could also be employed in the recesses in surfaces 14, 16 for securing the perimetric seals 18, 20 or could be used at the inner or outer edge of the carrier 12 to secure an edge molded sealing bead when such a bead is desired at such a location. Accordingly, it is intended that the invention is not to be limited, except as may be necessary in view of the appended claims.

What is claimed is:

1. A method of making a gasket having an edge-molded seal in an opening therethrough comprising the steps of:

(a) providing a plastic carrier defining at least one opening therethrough and having a wall surface to which an elastomeric seal is to be molded, said wall surface having a plurality of anchors projecting inwardly from said wall surface, each said anchor comprising an inner member and a hub connecting said inner member to said wall surface, said hub having a cross-sectional area which is less than that of said inner member, and (b) then molding an elastomeric seal against said wall surface to embed said hubs and inner members within said elastomer, whereby when said elastomer solidifies, said anchors secure said elastomeric seal to said plastic carrier.

2. The method of claim 1 and wherein said inner member is a plate spaced from said carrier wall surface by said hub.

3. The method of claim 1 and wherein said opening is a generally cylindrical opening through said carrier and said hub projects radially inwardly of said cylindrical opening.

4. The method of claim 1, and wherein said inner member is a flat plate.

5. The method of claim 1 and wherein the cross-sectional area of the hub is at least twenty percent less than that of said inner member.

* * * * *